United States Patent [19]

Nakano et al.

[11] Patent Number: 4,935,824

[45] Date of Patent: Jun. 19, 1990

[54] INFORMATION RECORDING APPARATUS

[75] Inventors: Kenji Nakano; Kazuyuki Ogawa, both of Kanagawa, Japan

[73] Assignee: Sony Corporation, Tokyo, Japan

[21] Appl. No.: 180,771

[22] Filed: Apr. 12, 1988

Related U.S. Application Data

[63] Continuation-in-part of Ser. No. 885,203, Jul. 14, 1988, Pat. No. 4,791,497.

[30] Foreign Application Priority Data

Apr. 15, 1987 [JP] Japan .................................. 62-092377

[51] Int. Cl.⁵ ............................................... G11B 5/09
[52] U.S. Cl. ..................................................... 360/48
[58] Field of Search ........................... 360/32, 48, 72.2

[56] References Cited

U.S. PATENT DOCUMENTS 4,622,600 11/1986 Okamoto et al. ...................... 360/48
4,672,480 6/1987 Yamamoto .............................. 360/32

Primary Examiner—Vincent P. Canney
Attorney, Agent, or Firm—Alvin Sinderbrand

[57] ABSTRACT

In an apparatus for recording and/or reproducing an information signal in successive slant tracks on a record tape; an information signal is recorded by a rotary head in only a part of a respective slant track scanned by the head on the tape, coded index data formed of a plurality of blocks is generated to identify a respective recorded information signal, such as, by an absolute tape-position address counted from an end or other reference position on the record tape, a "0" index signal is provided with a predetermined number of bits representing consecutive "0" values which can be detected for identifying the beginning of an event or program defined by the information signals recorded in a number of the slant tracks, and the "0" index signal and at least one block of the coded index data are supplied to the rotary head for recording by the latter in an index area of a slant track where no information signal is recorded.

15 Claims, 6 Drawing Sheets

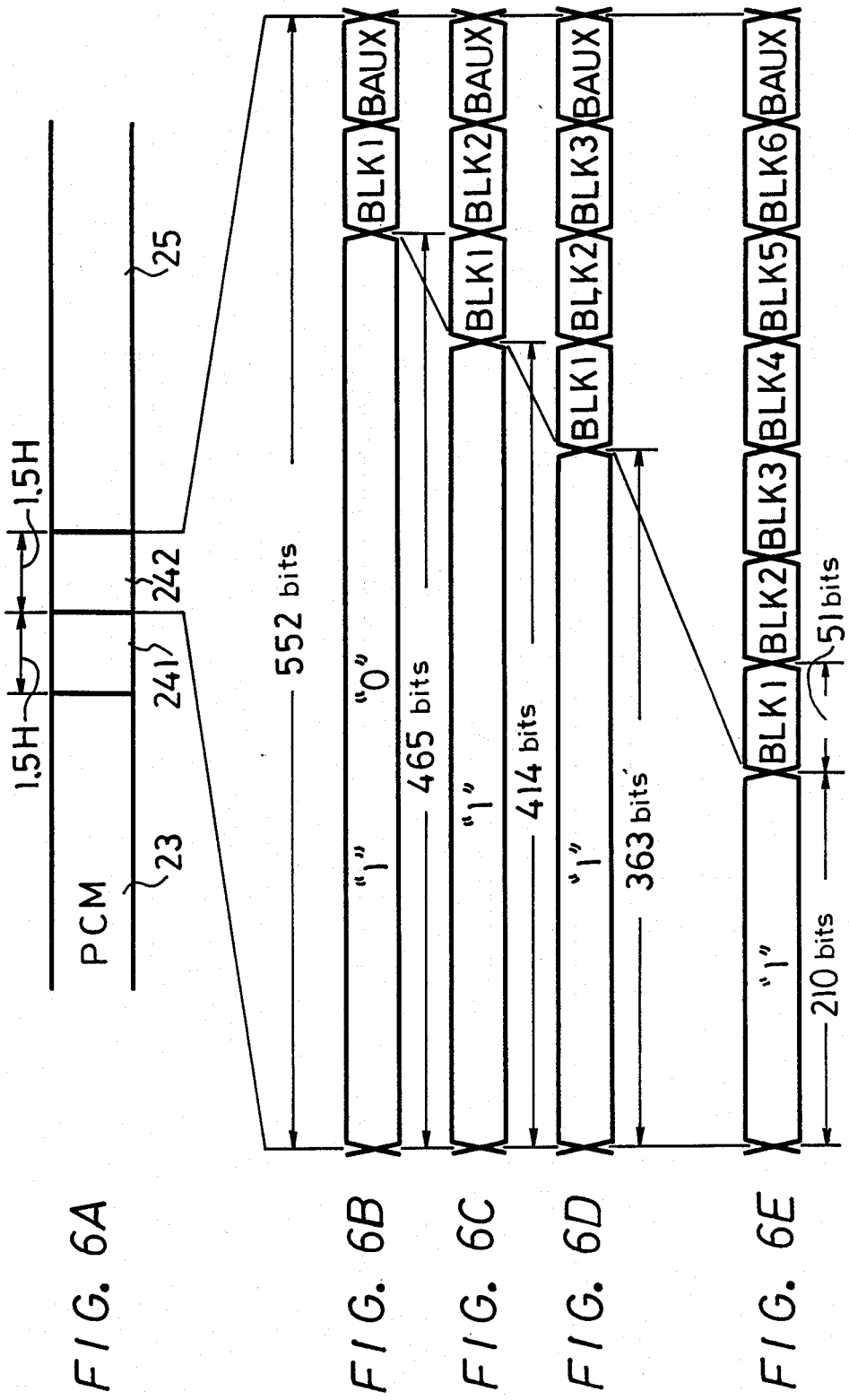

INFORMATION RECORDING APPARATUS

RELATED APPLICATIONS

This application is a continuation in part of the pending U.S. patent application Ser. No. 06/885,203 filed July 14, 1986, now U.S. Pat. No. 4,791,497 and having a common assignee herewith.

BACKGROUND IN THE INVENTION

1. Field of the Invention

This invention relates generally to helical-scan type apparatus for recording and/or reproducing information signals, such as, a video signal and a PCM (pulse-code modulated) audio signal, in respective parts of slant tracks on a record tape by means of a rotary head, and more particularly is directed to an arrangement in such apparatus for also recording index signals in the slant tracks so as to indicate the position along the tape of a starting point of a recorded event or program.

2. Description of the Prior Art

As is shown on FIG. 1, a rotary head assembly of a typical 8 mm video tape recorder includes recording and reproducing rotary magnetic heads HA and HB. These rotary magnetic heads HA and HB have gaps with different azimuth angles and are mounted on a rotary drum 1 with an angular spacing of 180° therebetween. Rotary heads HA and HB are rotated at a rotational speed equal to the standard frame frequency (30 Hz) in the direction indicated by 3 H and protrude slightly from the peripheral surface of the rotary drum 1. A magnetic tape 2 is wrapped around the peripheral surface of rotary drum 1 over an angular extent of 221° and is suitably transported at a constant speed in the direction indicated by an arrow 3T during recording and normal reproducing operations.

Accordingly, tracks 4A and 4B, each having a length corresponding to an angular extent of 221° on the surface of drum 1, are alternately formed on tape 2 by rotary heads HA and HB, respectively, as shown in FIG. 2. In a normal PCM mode of the 8 mm video tape recorder, a so-called overscan area AP of each track corresponding to an angular extent of 36° measured from a point at which the rotary head HA or HB starts scanning the track 4A or 4B, has recorded therein an audio signal corresponding to one field period of the video signal and which has been pulse-code modulated and time compressed. Within the succeeding main area AV of each track having a length corresponding to an angular extent of 180° there is recorded a color video signal of one field period. The remaining or concluding area of each track which corresponds to an angular extent of 5° is assigned as a spare or trace ending area at which the head is disengaged from the track.

Further, the PCM audio signal can be recorded and reproduced by the 8 mm video tape recorder in a so-called "multi-PCM" or "audio-use" mode in which, as disclosed in detail in U.S. Pat. No 4,542,419, issued on Sept. 17, 1985 and having a common assignee herewith, the main recording area AV of each track is also used for recording PCM audio signals. In such audio-use or multi-PCM mode, the 8 mm video tape recorder becomes exclusively a PCM audio signal recording and/or reproducing apparatus in which PCM audio signals can be recorded in multiple channels. More specifically, as shown in FIG. 3, in the audio-use or multi-PCM mode, the area AV of each track corresponding to the angular range of 180° is divided equally by five and the PCM audio signal is recorded in a selected one of these divided portions during scanning of each track. Therefore, the whole area of each track shown on FIG. 2, including the area AP and the area AV, is divided into six track areas AP1 to AP6, each corresponding to an angular range or extent of 36°, and first to sixth track channels are formed by the same numbered segments or track areas AP1 to AP6 of the respective skewed tracks 4A, 4B, 4A, 4B, etc., shown on FIG. 3, whereby a suitably time compressed PCM audio signal can be recorded in any desired channel. For example, the PCM audio signal may be recorded first in the segments or track areas AP1 of the successive tracks, 4A, 4B, from one end of the tape to the other. Thereafter, the PCM audio signal may be further recorded in segments or track areas AP2 of the successive tracks from one end of the tape to the other. Accordingly, PCM audio signals can be recorded in and reproduced from each of the six channels with the result that, in the audio-use or multi-PCM mode shown on FIG. 3, the tape 2 has an audio recording time or capacity six times as long as when a PCM audio signal is recorded only in the overscan area AP of each track, as on FIG. 2.

In each case of the multi-PCM mode, the PCM signal processing circuit used for each of the multiple channels may be the same signal processing circuit provided for processing the PCM audio signal recorded in the single channel constituted by the track areas AP in the prior art 8 mm video tape recorder.

The track format of the above mentioned 8 mm video tape recorder in its normal PCM mode will now be described more fully with reference to FIG. 4, in which contact of the rotary head with the tape 2, that is, the starting point of the track, begins at the left-hand side where there is provided a contact starting area having a length corresponding to a head rotation angle of 5°, and which consists of a tracking start area 21 of 2.94° and an area 22 of 2.06° corresponding to three horizontal periods (3 H) of the video signal and which is assigned as a preamble area for use as a clock run-in area synchronized with the succeeding PCM data. Following the preamble or clock run-in area 22, there is provided a PCM data recording area 23 having an angular extent of 26.32° and in which a time compressed PCM audio signal is recorded. A postamble area 24 also having an angular extent of 2.06° (3 H) follows the PCM data recording area 23 so as to be used as a back margin area to cope with the displacement of the recording position when the recording is carried out in the so-called after-recording mode. A next area 25 having an angular extent of 2.62° is assigned as a guard band area for separating the video signal area 26 which follows from the PCM data area 23. The video recording area 26 has an angular range or extent of 180° as earlier noted for receiving the recorded color video signal of one field period. Following the area 26, there is provided a head disengaging area 27 having the angular extent of 5° and in which the rotary head is disengaged or separated freely from the magnetic tape.

The PCM data recorded in each recording area 23 is formed by interleaving audio data of one field period and index data associated with the audio data and encoding the same. The index data is formed by coding various identifying information, such as, the recording date, absolute address, program number and the so-called time code. Such index data is useful for locating a starting point of a recorded event or program for reproduction or editing.

However, if the index data is interleaved with the audio data and encoded in a mixed state, as described above, the index data cannot be extracted without de-interleaving the PCM data and then decoding the same. Thus, when the index data is used in a program search or editing operation, it takes considerable time to process the index data.

Further, in a search operation, the magnetic tape 2 moves at high speed, for example, 30 times the standard tape speed in the recording mode, so that the rotary head traces obliquely across the recording area 23. As a result, it is difficult to correctly reproduce the index data recorded therein with the audio data.

To solve the foregoing problems, it has been proposed, for example, as disclosed in the parent U.S. patent application Ser. No. 06/885,203, filed July 14, 1986, and having a common assignee herewith, to provide coded index data similar to the index data recorded with the PCM audio data in each recording area 23, and which is recorded in the postamble area 24 following the PCM signal recording area 23.

Recording of index data in the postamble area 24 will now be further explained with reference to FIGS. 5A-5F which illustrate a desired recording format with increasing detail. As shown in FIGS. 5A and 5B, the postamble area 24, having a length of three horizontal periods, that is, of 3 H, is further segmented into a first half-area 241 of 1.5 H and a second half-area 242 of 1.5 H. The half-area 241 is used to record a postamble signal for the PCM data and the half-area 242 is an index area used to record and/or reproduce the coded index data. As shown in FIG. 5C, the index area 242 is still further divided into an initial preamble signal area $242_1$ of 0.5 H and a subsequent index data area $242_2$ of 1 H in which coded index data CDIX is recorded.

The coded index data CDIX is formed of 7 blocks comprised of blocks BLK1 to BLK6 and an auxiliary block BAUX as shown in FIG. 5D. The auxiliary block BAUX is employed, for example, as an end mark. As shown in FIG. 5E, each of the blocks BLK1 to BLK6 comprises a block header of 3 bits, ID codes ID0 to ID4 each comprised of 8 bits, and a CRC code CRCC of 8 bits. The CRC code is what might be called a cyclic redundancy check code used to detect errors contained in the ID codes.

The ID codes ID0 to ID4 are exactly the same as the ID codes ID0 to ID4 recorded with the PCM audio data in the area 23 and indicate data, such as, a cut number, recording date and time, the absolute position on the magnetic tape 2 or the like.

Generally, the PCM data is recorded in the area 23 on the tape with the binary code data having a logic level "1" or "0" being modulated to signals of respective frequencies. In the 8 mm video tape recorder, for example, the data having the logic level "1" is modulated to, or represented by a recorded signal having a frequency of 5.8 MHz, while the data having the logic level "0" is modulated to, or represented by a recorded signal having a frequency 2.9 MHz.

Similarly, the index data CDIX is converted into a bi-phase signal which is recorded on the magnetic tape 2, and which has a frequency of 2.9 MHz for logic "0" and 5.8 MHz for logic "1".

If the index data CDIX is recorded in the index area 242 independent of the PCM data area 23 as mentioned hereinabove, it is possible to immediately obtain the index data by tracing the postamble area 24 in the reproducing mode. Even in the search mode with a tape speed 30 times as high as that in the recording mode, the index area 242 is short, that is it corresponds to only 1.5 H, so that the rotary head can positively reproduce the index data CDIX recorded therein. Further, since the index data CDIX is recorded in the index area 242 which is provided independently of the PCM data area 23 and separated from the latter by the postamble area 241, the index data can be independently and easily recorded in the index area 242 within the postamble area 24 of the recorded track in an after-recording mode, that is, a mode in which the index data is recorded after recording of the PCM data.

If the index signal is merely to represent a relative position on the tape, that is, if the index signal is merely indicative of the starting point of a tune, event, program or the like but does not absolutely locate such starting point, it is only necessary that the index signal be discriminated from the video signal and the PCM audio data which make up the information signal recorded on the tape. Thus, for example, if a postamble signal recorded in postamble area 24 is a single tone signal having a frequency of 5.8 MHz and thus corresponding to PCM data of all "1"s, an index signal which can be readily discriminated from this postamble signal and which has a very small probability of appearing as PCM audio data can be a single tone signal having a frequency of 2.9 MHz and which corresponds to data consisting of consecutive "0"s only. In such so-called "0" index system, the index signal generator ca be simplified and provided at low cost so that it can be used in a relatively inexpensive version of a recording and/or reproducing apparatus.

However, in the "0" index system, that is, where only relative position information is provided, the actual position along the tape can be determined from such relative position information only by counting the number of the index signals as the tape is searched from its head or leading end. However, if a tape cassette is ejected from a video tape recorder and then loaded therein again, and the starting point of a recorded event is searched beginning from a point midway between the ends of the tape, it is impossible to know the count of the first detected index signal measured from the head end of the tape.

Therefore, it is desirable to achieve compatibility between the "0" index system and the coded index system. To achieve such compatibility, it has been proposed, for example, as disclosed in the previously more completely identified U.S. patent application Ser. No. 06/885,203, to record both coded index data and "0" index data in successive halves, respectively, for example, in the areas 241 and 242, of the postamble area 24. Since each of the areas 241 and 242 has a length corresponding to 1.5 H, they are adequate for the recording therein of the coded index data and the "0" index data. However, by using the area 241 for recording of the coded index data, the postamble area recorded with "1"s is omitted between the recorded PCM audio data in area 23 and the coded, index data of similar format in area 241 with the result that the end of the PCM audio data in area 23 may not be readily discriminated. In order to permit retention of the postamble area 241 recorded with successive "1"s, consideration may be given to the use, as a "0" index area, of the preamble area $242_1$ (0.5 H) constituting the initial part of the index area 242 (FIG. 5C). In other words, the pre-amble area $242_1$, which is generally recorded with logic "1", is rewritten as logic "0". However, the preamble area $242_1$ of 0.5 H is represented as 210 bits at the most.

In respect to the foregoing, it should be noted that, in the "0" index system, consecutive data "0"s of more than a predetermined number have to be written so as to be surely discriminated from the information signal data. For example, a detecting circuit at the reproducing side may have to detect consecutive "0"s of more than 256 bits in order to surely indentify the starting point of the recorded event or program. In that case, if consecutive "0"s of no more than 210 bits are written in the preamble area $242_1$, they cannot be surely detected as the "0" index.

OBJECTS AND SUMMARY OF THE INVENTION

Accordingly, it is an object of the present invention to provide an improved information recording and/or reproducing apparatus which can avoid the foregoing problems encountered with the prior art.

It is another object of the present invention to provide an information recording and/or reproducing apparatus which can satisfactorily establish compatibility between the "0" index and coded index systems.

It is a further object of the present invention to provide an information recording and/or reproducing apparatus, as aforesaid, which can be applied to an 8 mm video tape recorder.

It is yet a further object of the present invention to provide an information recording and/or reproducing apparatus as aforesaid, which can be applied to a PCM (pulse code modulated) audio signal recording and/or reproducing apparatus.

According to an aspect of the present invention, an information recording and/or reproducing apparatus comprises: a rotary head for recording an information signal of a predetermined period in only a part of a slant track scanned by the head on a record tape; means for generating coded index data formed of a plurality of data blocks and identifying a respective recorded information signal; means for generating an index signal having a predetermined number of bits representing consecutive logic values which are the same for identifying the beginning of an event or program defined by the information signals recorded in a number of the slant tracks; and control means for supplying said index signal and at least one of said blocks of the coded index data to the rotary head for recording by the letter in an index area of a slant track which is separated by a postamble area, from the part of the slant track in which the information signal is recorded.

The above, and other objects, features and advantages of the present invention, will become apparent from the following detailed description of a preferred embodiment which is to be read in conjunction with the accompanying drawings, and throughout which the same reference numerals are used to designate like elements and parts.

BRIEF DESCRIPTION OF THE DRAWINGS

FIGS. 6A–6E are schematic representations of the formats used in accordance with embodiments of the invention for recording an index signal of the "0" index system type and coded index data in an index area on a slant track apart from the area in which an information signal is recorded.

DETAILED DESCRIPTION OF THE PREFERRED EMBODIMENTS

Figures 5A, 5B, 5C:
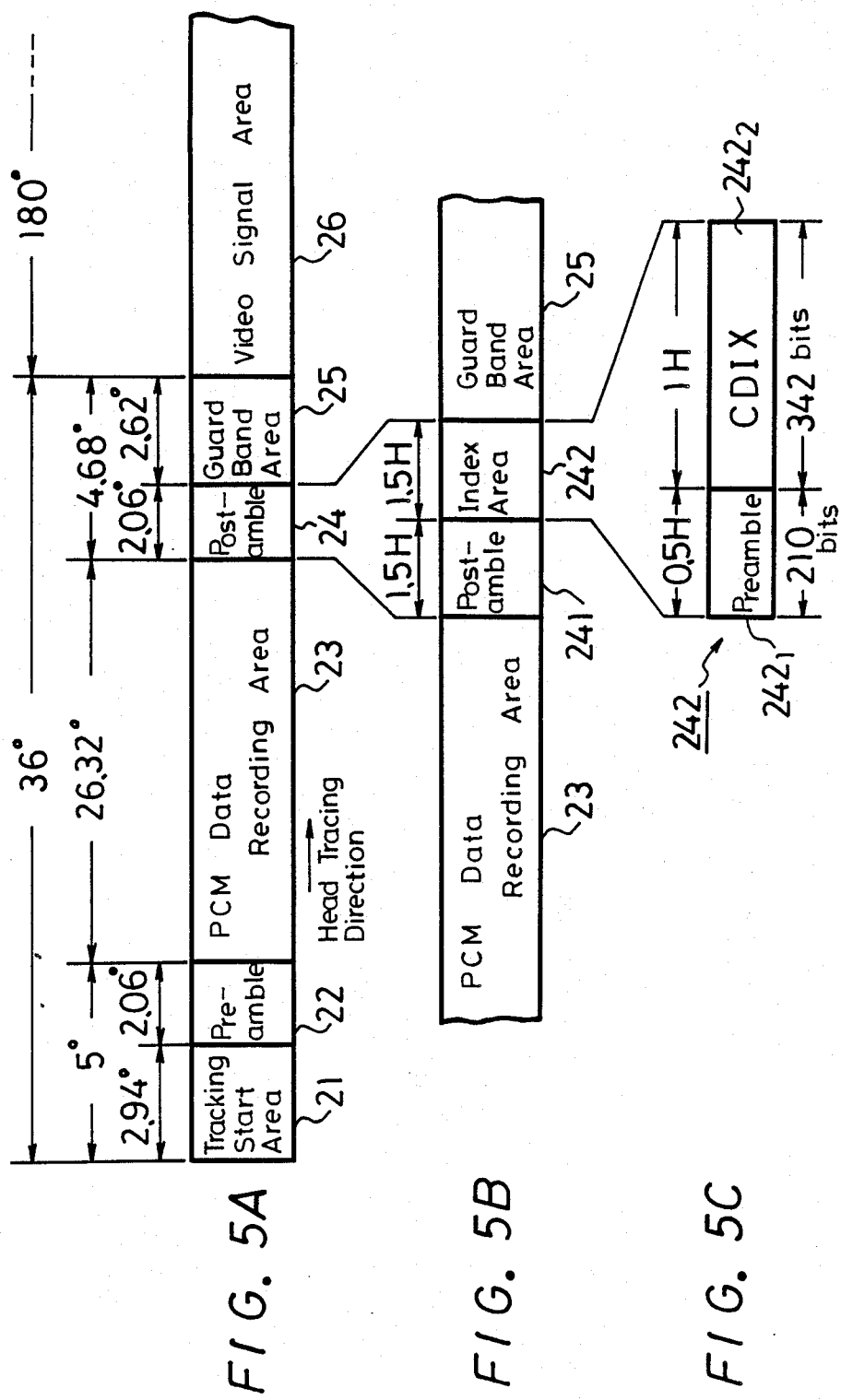
FIG. 5A–5F are schematic representations of formats used for recording a PCM audio signal and coded index data in respective parts of a slant track.
Figure 5D:
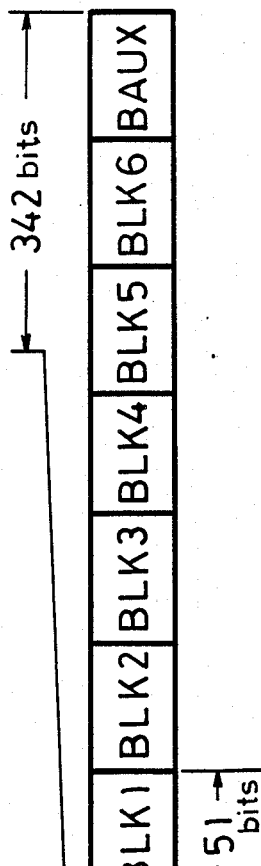
Figure 5E:
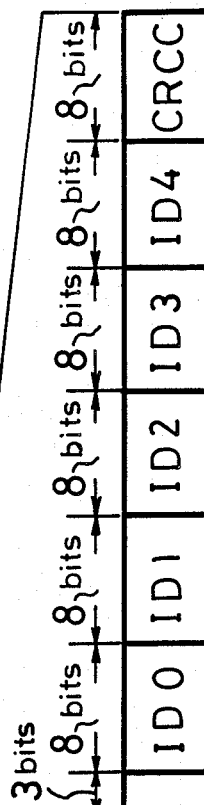

Referring now to FIGS. 6A–6E in detail, it will be seen that FIG. 6A is similar to FIG. 5B in that it particularly shows the postamble area 241 and the index area 242 each of 1.5 H and being arranged in sequence between the PCM recording area 23 and the guard band area 25. In accordance with an embodiment of the present invention which is applied, by way of example, to the previously described 8 mm video tape recorder, the area 241 is retained as a postamble area following the area 23 in which PCM audio data are recorded, and the number of coded index data blocks BLK1–BLK6 recorded in the index area 242 is varied between one block BLK1 (FIG. 6B) and six blocks BLK1–BLK6 (FIG. 6E). By reason of such variable number of coded index data blocks recorded in the index area 242 which has a total length of 552 bits, that is, 210 bits for the preamble area $242_1$ and 342 bits for the index data area $242_2$, as shown on FIG. 5C, even if five coded index data blocks are recorded in the index area 242, the remaining length of the index area 242 corresponds to 261 bits. Such remaining length of 261 bits corresponds to the 210 bit length of the preamble area $242_1$ and the 51 bit length of the single omitted coded index data block. This area having a length of 261 bits exceeds the threshold value of 256 consecutive "0"s needed to detect the "0" index. Thus, if the area having a length of 261 bits is utilized as the "0" index area, it becomes possible to establish compatibility between the "0" index and the coded index even though as many as five coded index data blocks are recorded in the index area 242.

It is possible that the starting point of a recorded event or program will not be reliably detected on the basis of the "0" index if the bit length of the area provided within the index area 242 to receive the "0" index is near to the threshold value of 256 bits. In order to avoid such possibility, the bit length of the area within index area 242 provided to receive the "0" index may be extended further, for example, to 465 bits by recording the coded index data in the single block BLK1, as shown on FIG. 6B. In such case, "1"s are normally written as a preamble signal in such "0" index area of 465 bits length and, in the slant tracks corresponding to the starting point of a recorded event or program, all of such "1"s are replaced by recorded consecutive "0"s to provide the reliably detected "0" index of 465 bits.

When as shown in FIGS. 6C to 6E coded index data of two or more blocks are written in the index area 242, "1"s are written as a preamble signal in all of the index area 242 not occupied by the coded index data, and these "1"s are replaced by "0"s to form the "0" index at the starting point of each recorded event or program.

In the case where only a single block BLK1 is recorded as the coded index data in index area 242, such block can contain a time code comprised of hour, minute, second and frame number indications. Such time code may be contained or written only in the block BLK1 recorded in a track by the rotary head HA, while the block BLK1 recorded in a track by the rotary head HB contains other optional codes, for example, representing the date, program number and the like.

The data format within each of the blocks BLK1-BLK6 is made the same as that of the ID (identifying) word contained in the PCM audio data.

Figure 7:
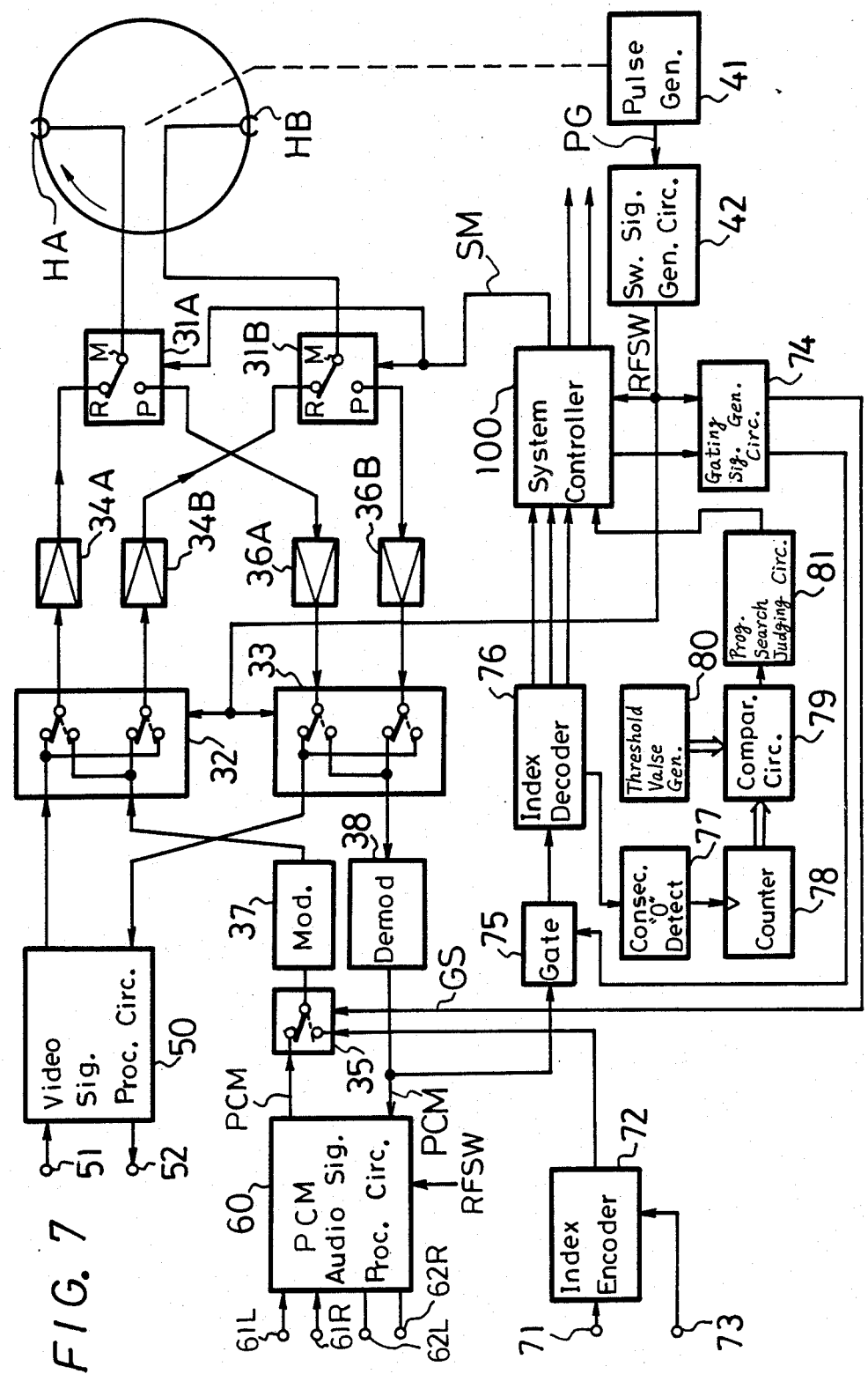
FIG. 7 is a schematic block diagram showing an apparatus for recording and/or reproducing an information signal according to an embodiment of this invention.

Referring now to FIG. 7, it will be seen that an apparatus there shown for recording and/or reproducing information signals according to this invention is associated with an 8 mm video tape recorder and includes recording and/or reproducing change-over switching circuits 31A and 31B to which a recording or reproducing switching signal SM is applied from a system controller 100 incorporating a microcomputer. Each of switching circuits 31A and 31B engages its movable contact M with a recording contact R upon recording and is changed-over to engage a playback contact P upon reproducing.

Rotary head change-over switching circuits 32 and 33 are operated by a head switching signal RFSW to be alternately disposed in the positions shown in full lines and in dotted lines, respectively, at every ½ revolution of the rotary recording/reproducing heads HA and HB.

A pulse PG having a frequency of 30 Hz is generated by a pulse generator 41 so as to be indicative of the absolute rotary phase of rotary heads HA and HB and is supplied to a switching signal generating circuit 42 from which a square wave signal having a duty ratio of 50% is derived as the switching signal RFSW.

In the normal PCM recording mode of the apparatus shown on FIG. 7, an input video signal $V_{in}$ applied to an input terminal 51 is supplied to a video signal processing circuit 50 in which it is suitably processed. The output signal from video signal processing circuit 50 is then supplied to switching circuit 32. The switching circuit 32 is alternately switched by switching signal RFSW at every half revolution of rotary heads HA and HB which are controlled by a drum phase servo taking the pulse PG as a reference phase so that, when rotary head HA scans the area AV of a track 4A, the video signal is supplied through a recording amplifier 34A and switching circuit 31A to rotary head HA and is thereby recorded on this area AV of the respective track 4A. In like manner, when rotary head HB scans the area AV of a track 4B, the video signal is supplied through a recording amplifier 34B and switching circuit 31B to rotary head HB and is thereby recorded on the area AV of the respective track 4B.

Left and right channel audio signals applied to input terminals 61L and 61R are both supplied to a PCM audio signal processor 60 and are therein processed to PCM data.

The PCM data for one slant track is generally formed so that an information signal, such as, an audio signal and the like, having a constant time period, for example, corresponding to one field, is divided into a plurality of blocks and a block synchronizing signal and a block address signal are added to each of the divided blocks.

Figure 5F:
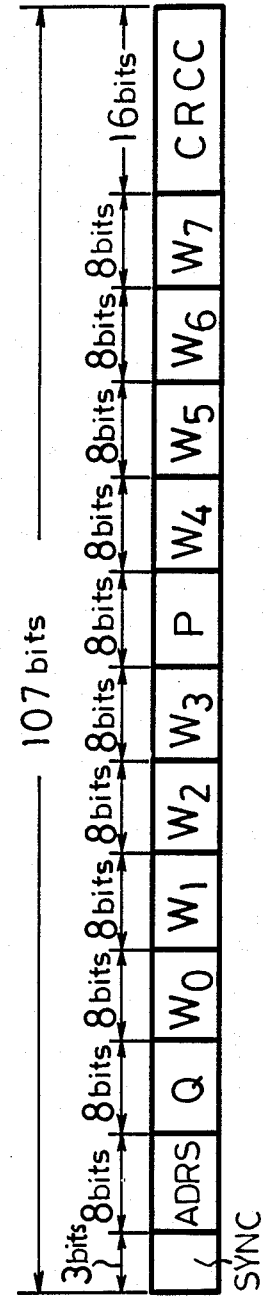

In the PCM audio data of the 8 mm video tape recorder, the data of one track area AP or $AP_1$-$AP_6$ is formed of 132 blocks and, as shown on FIG. 5F, each block is formed of a block synchronizing signal SYNC of 3 bits, a block address word ADRS of 8 bits, error correction parity words P and Q each of 8 bits, audio data words W0 to W7 each of 8 bits, and an error detection CRC (cyclic redundancy check) code of 16 bits. In other words, the audio signal is digitized, the resulting digital signal is divided into 132 blocks for each field period thereof, the parity words P and Q, each of which is an error correction code, are generated, and the CRC code is generated for each block. The switching signal RFSW is supplied from its generating circuit 42 to the PCM audio signal processor 60 which, on the basis of such switching signal, forms a PCM area signal corresponding to the scanning of the PCM record area 23 of a slant track by the head HA or HB. In the recording mode, the PCM audio data for one field is written in a RAM (not shown) contained in the processor 60, and such PCM audio data is read from the RAM during the period of time specified by the PCM area signal. Thus, PCM audio data of one field period are time-base-compressed, as read out, to about one-fifth the original duration. The thus read out PCM audio data are supplied to a first input of a switching circuit 35 which, in the state shown in full lines on FIG. 7, passes the PCM audio data to a modulating circuit 37, in which data of the logic value "1" is converted into a signal of 5.8 MHz and data of the logic value "0" is converted into a signal of 2.9 MHz. The resulting modulated signal is supplied to the switching circuit 32, in which, in response to the changing-over of switching circuit 32 by switching signal RFSW, the modulated PCM audio signal is selectively supplied to the rotary heads HA and HB.

Thus, the modulated PCM audio signals are recorded in the PCM data recording area 23 of the overscan area AP of each track 4A by the head HA, and in the PCM data recording area 23 of the overscan area AP of each track 4B by the head HB.

Following the recording of a modulated PCM audio signal in a respective recording area 23, there is recorded in the subsequently scanned index area 242 at least one block BLK1 of coded index data, with the remainder of such index area 242 having recorded therein data representing successive "1"s or "0"s as a preamble or as a "0" index, respectively, as shown in any one of FIGS. 6B to 6E. In order to provide the foregoing data for recording in the index area 242, index information, such as, the recording date, absolute address, time information and the like, is supplied through an input terminal 71 to an index encoder 72. A "0" index specifying signal is also supplied through an input terminal 73 to the index encoder 72, for example, in response to actuation of a program search index switch (not shown). When such program search index switch is actuated, the index encoder 72 responds to the reception of the "0" index specifying signal at its terminal 73 by producing data formed of consecutive "0"s only followed by, for example, one block BLK1 of coded index data (FIG. 6B) corresponding to the index information received at the terminal 71, during an index interval corresponding to the scanning of a predetermined number of tracks after the search index switch is actuated. If on the other hand the program index switch is not actuated or is in its off state, the index encoder 72 produces, during the index interval, as many as six coded index data blocks BLK1 to BLK6 corresponding to the index information supplied thereto from the input terminal 71 and being preceded by as many consecutive data "1"s as will fit in the index area 242 to serve as a preamble.

The above described output signal from the index encoder 72 is supplied to a second input of the switching circuit 35 to be passed through the latter to the modulator 37 when the switching circuit 35 is changed-over to the state indicated in broken lines on FIG. 7. In order to effect the controlled change-over of the switching circuit 35, the switching signal RFSW from the switching signal generating circuit 42 is supplied to a gating signal generating circuit 74 which also receives a respective control signal from the system controller 100. In response to the signal RFSW and the control signal from the controller 100, the circuit 74 provides a switching signal GS which normally has the value "0" and is changed over to the value "1" only during each period corresponding to the scanning of the postamble area 24 of a slant track by the head HA or HB. The switching signal GS is supplied to the switching circuit 35 so that the latter is changed-over to the state shown in broken lines in response to the "1" value of the signal GS. Thus, in the first half 241 of the postamble area 24 of the PCM recording area AP, there are recorded consecutive "1"s to serve as the postamble signal, and, in the index area 242, there are recorded the program search "0" index data followed by coded index data CDIX, or there are recorded the normal successive "1"s forming a postamble followed by only the coded index data CDIX depending on whether or not the program index switch has been actuated.

In the reproducing or playback mode of the apparatus shown on FIG. 7, the rotary phase of the rotary drum is again servo-controlled on the basis of the pulse signal PG generated from pulse generator 41.

As is well known, in the case of the 8 mm video tape recorder, tracking pilot signals (not shown) of a so-called 4-frequency system are periodically recorded on each of the tracks 4A and 4B so that, during reproducing, tracking servo is effected with reference to the 4-frequency system tracking pilot signals.

In the playback mode, the reproduced signal outputs from rotary heads HA and HB are respectively supplied through playback amplifiers 36A and 36B to the switching circuit 33. Switching circuit 33 is changed-over in response to switching signal RFSW so that the video signal from the area AV of each track is supplied to the video processing circuit 50, while the signal from the area AP of each track is supplied to a demodulating circuit 38, in which the bi-phase signal is reconverted into PCM data of "0" or "1". This PCM data is supplied to the PCM signal processor 60.

In the video signal processing circuit 50, the video signal is demodulated and then delivered to an output terminal 52.

In the PCM signal processor 60, the reproduced PCM signal is error-detected and error-corrected or the like and then is reconverted into left- and right-channel analog audio signals which are supplied to output terminals 62L and 62R.

The output signal from the demodulating circuit 38 is also supplied to a gate circuit 75. A gating signal is supplied from the gating signal generating circuit 74 to the gate circuit 75 which is thereby opened to derive the index data reproduced from the index area 242. This index data is supplied from gate circuit 75 to an index decoder 76. The index decoder 76 decodes the coded index data block or blocks and supplies the respective decoded output to the system controller 100. The system controller 100 produces a predetermined control command in response to the received coded index data.

A consecutive "0" judging circuit 77 is provided to receive the data passed by gate circuit 75 other than the coded index data from the index decoder 76 and to detect consecutive "0"s disposed in advance of the coded index data CDIX in the index area 242. The judging circuit or "0" detector 77 provides a detected output at every bit of the consecutive "0"s data, and such detected output is supplied to a clock terminal of a counter 78. The counter 78 counts the bit number of the data constituting consecutive "0"s. The count output from the counter 78 is supplied to a comparing circuit 79 in which it is compared with a threshold value, for example, "256", established by a threshold value generating circuit 80. The comparing circuit 79 provides a compared output to program search judging circuit 81 when the count output from the counter 78 exceeds "256" or any other threshold value established by circuit 80. In response to such compared output from circuit 79, the program search judging circuit 81 detects that the tape being played back in the search mode is at the starting point of a recorded program or event and provides a corresponding output to the system controller 100. The system controller 100 responds to the judged output to produce a control signal by which movement of the tape is halted.

In the manner indicated above, control operations can be effected using the coded index and the "0" index. Further, the described arrangements of the coded index data and the "0" index in the index area 242 of a slant track ensure that a record tape thus recorded with both types of index signals will be compatible with a playback apparatus in which only the "0" index is decoded. Moreover, the postamble area 241 is retained between the area 23 in which the PCM data is recorded and the index area 242 in which the coded index data having a similar format is recorded so as to ensure the reliable discrimination of both types of data. Further, the area provided within index area 242 to receive the "0" index data is of sufficient bit length to ensure that the bit length of the recorded "0" index data well exceeds the threshold value established for the reliable detection thereof.

A tracking pilot signal may or may not be recorded in the index signal recording area 242. In general, since the pilot signal is also recorded in the PCM area AP, and since the index signal recording area 242 is as short as 1.5 H, the omission of the tracking pilot signal from the area 242 will hardly affect the tracking servo operation.

Figure 1:
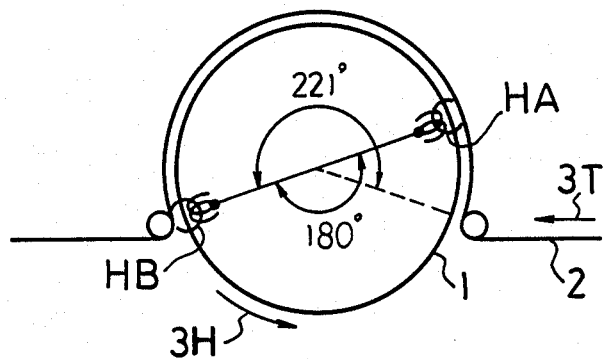
FIG. 1 is a schematic diagram showing a known rotary head assembly of a recording and/or reproducing apparatus to which the present invention may be advantageously applied.
Figure 2:
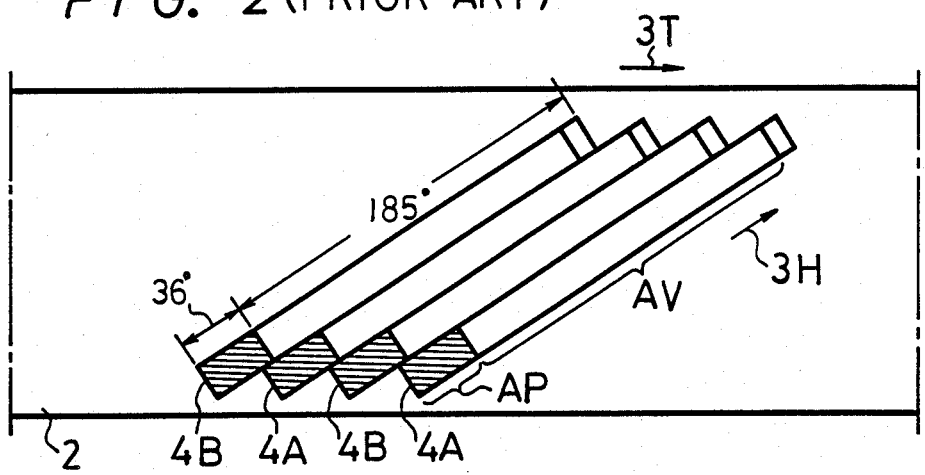
FIGS. 2 and 3 are schematic diagrams showing recording track patterns formed by the rotary head assembly of FIG. 1 for different recording modes thereof.
Figure 3:
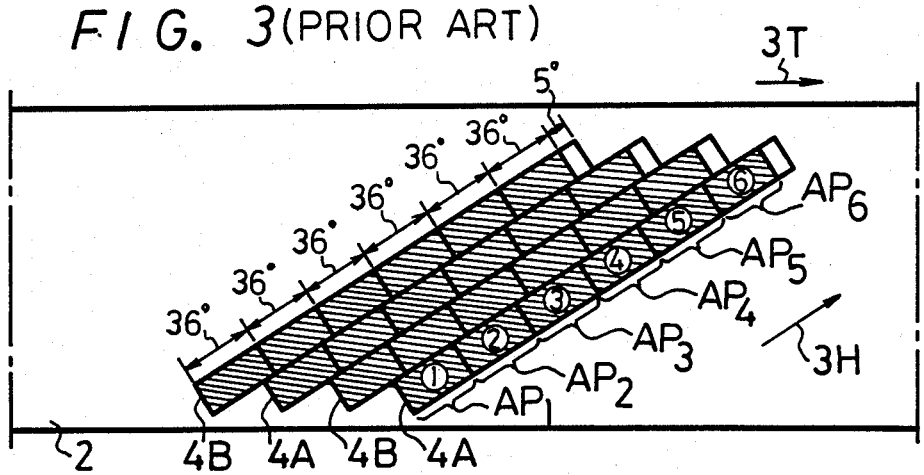
Figure 4:
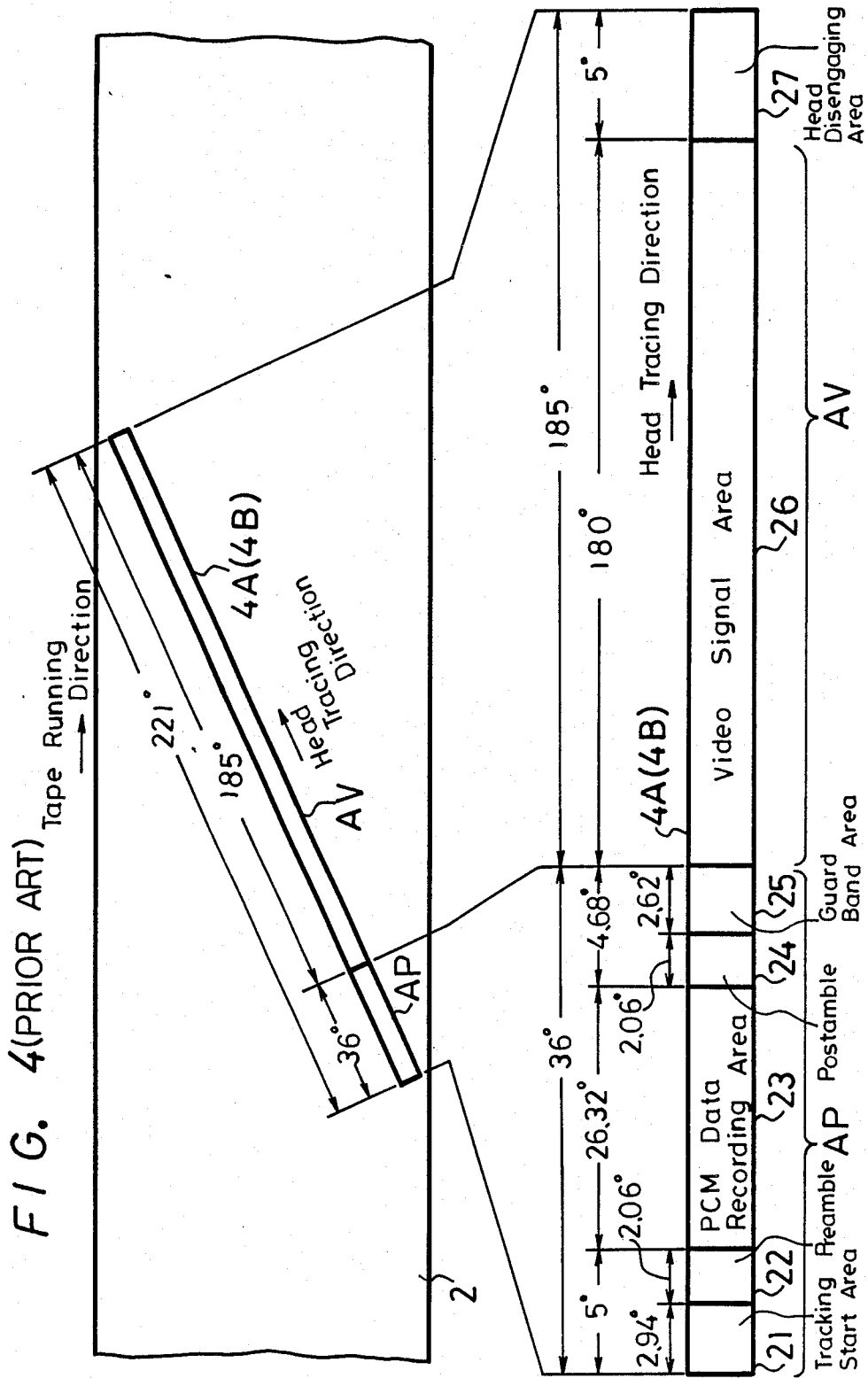
FIG. 4 is a schematic diagram showing a track format used in the recording mode of FIG. 2.

The present invention can also be applied in the so-called "multi-PCM" or "audio-use" mode of the 8 mm video tape recorder which has been previously described with reference to FIG. 3. In that case, each of the track areas AP1 to AP6 includes a PCM recording area 23 and an index area 242 forming part of a postamble area 24, and, in accordance with this invention, "0" index data and coded index data are both recorded in such index area 242.

It will be appreciated that, in accordance with the present invention, as described above, a recording format is provided in which it is sufficient that the coded index data is recorded at least in one block in the area 242 and the remainder of such index area 242 is utilized as the "0" index data area. Thus, compatibility between the "0" index and the coded index is established, that is, a record tape recorded with both coded index data and "0" index data can be played-back in a conventional apparatus employing only the "0" index system.

Although preferred embodiments of the invention have been described in detail with reference to the accompanying drawings, it will be apparent that the invention is not limited to those precise embodiments, and that many modifications and variations could be effected therein by one skilled in the art without departing from the spirit or scope of the invention as defined by the appended claims.

What is claimed is:

1. An apparatus for recording an information signal in limited parts of successive slant tracks on a recording medium by means of a rotary head, each said track having an index area which is separated by a postamble area from said limited part of the respective track, said apparatus comprising:
    means for processing a first information signal in a digital form;
    means for supplying the processed first information signal to said rotary head for recording in said limited parts of the slant tracks;
    means for generating coded index data which is formed of a plurality of data blocks and identifies a respective recorded information signal;
    means for generating an index signal having a predetermined number of bits representing consecutive logic values which are the same for identifying the beginning of a group of said slant tracks; and
    control means for supplying said index signal and at least one of said blocks of said coded index data to said rotary head for recording by the latter in said index area of a slant track which is separated by said postamble area from said limited part of the respective track.

2. An apparatus according to claim 1; wherein said first information signal is an audio signal.

3. An apparatus according to claim 1; wherein the number of data blocks of said coded index data is variable.

4. An apparatus according to claim 1; wherein said index signal replaces a preamble portion in said index area when said index signal is recorded.

5. An apparatus according to claim 4; wherein said index signal comprises consecutive "0"s and said preamble portion comprises consecutive "1"s.

6. An apparatus according to claim 1; further comprising means for recording a second information signal in said slant track in a portion of the latter which is different from said limited part where said first information signal is recorded.

7. An apparatus according to claim 6; wherein said second information signal is a video signal.

8. An apparatus according to claim 6; wherein said second information signal comprises a plurality of channels of audio signals.

9. An apparatus for recording and/or reproducing information signals in successive slant tracks on a record tape, comprising:
    information signal processing means for converting input information signals to a digitized form in which the information data for a predetermined length of time is grouped as a plurality of data blocks;
    rotary head means connected to said information signal processing means for recording and/or reproducing said grouped data blocks containing a digitized information signal for said predetermined length of time in a first part of a respective slant track on the tape;
    means for generating coded index data formed of a plurality of blocks;
    means operative selectively for generating consecutive first logic values as a postamble signal and as a preamble signal for said coded index data, and for generating consecutive second logic values of at least a predetermined bit length as an index signal identifying the start of a respective group of said slant tracks;
    means responsive to rotation of said rotary head means for providing an index area signal in correspondence to the scanning by said rotary head means of an index area of a respective slant track which is spaced from said first part of said respective track by an intervening postamble area; and
    control means responsive to said index area signal and having a first state in which said consecutive first logic values are supplied to said rotary head means for recording as a postamble signal in said postamble area and in a contiguous portion of said index area as a preamble signal and then at least one of said blocks of the coded index data is supplied to said rotary head means for recording in a remainder of said index area, said control means further having a second state in which said consecutive second logic values of at least said predetermined bit length are supplied to said rotary head means for recording in said index area as said index signal in place of said preamble signal and followed by said at least one block of the coded index data recorded in said remainder of the index area.

10. An apparatus according to claim 9; wherein said input information signals are audio signals.

11. An apparatus according to claim 9; wherein the number of said blocks forming said coded index data is variable.

12. An apparatus according to claim 9; wherein said first logic values are "1"s and said second logic values are "0"s so that said index signal is a "0" index signal of sufficient bit length to be reliably detected.

13. An apparatus according to claim 9; further comprising means for supplying to said rotary head means second information signals for recording in second parts of slant tracks which are each apart from said first part, postamble area and index area of the respective slant track.

14. An apparatus according to claim 13; wherein said second information signals are video signals and the first mentioned information signals are audio signals.

15. An apparatus according to claim 13; in which the first mentioned information signals are audio signals and said second information signals are additional channels of audio signals.

* * * * *